(12) United States Patent
Bush et al.

(10) Patent No.: US 10,819,462 B2
(45) Date of Patent: Oct. 27, 2020

(54) SYSTEM AND METHOD FOR PROTECTING COMMUNICATION IN TIME-SENSITIVE NETWORKS USING SHARED SECRET INFORMATION

(71) Applicant: General Electric Company, Schenectady, NY (US)

(72) Inventors: Stephen Francis Bush, Niskayuna, NY (US); Guillaume Mantelet, Oakbank (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 407 days.

(21) Appl. No.: 15/833,732

(22) Filed: Dec. 6, 2017

(65) Prior Publication Data

US 2019/0123847 A1     Apr. 25, 2019

Related U.S. Application Data

(60) Provisional application No. 62/575,719, filed on Oct. 23, 2017.

(51) Int. Cl.
*H04K 1/00* (2006.01)
*H04L 9/08* (2006.01)
(Continued)

(52) U.S. Cl.
CPC .............. *H04K 1/00* (2013.01); *H04J 3/0697* (2013.01); *H04L 9/0852* (2013.01);
(Continued)

(58) Field of Classification Search
CPC ..... H04L 9/0852; H04L 63/061; H04L 62/12; H04L 63/1425; H04L 63/1475
See application file for complete search history.

(56) References Cited

U.S. PATENT DOCUMENTS

| 5,741,898 A | 4/1998 | Hanley et al. |
| 6,603,857 B1 | 8/2003 | Batten-Carew et al. |
| (Continued) | | |

FOREIGN PATENT DOCUMENTS

WO    2013147873 A1    10/2013

OTHER PUBLICATIONS

Kapur, R. K.; "Secure Data Transfer in MANET Using Symmetric and Asymmetric Cryptography", 2015 4th International Conference on Reliability, Infocom Technologies and Optimization (ICRITO) (Trends and Future Directions), pp. 1-5, Noida, Sep. 2-4, 2015, (5 pages).

(Continued)

*Primary Examiner* — Paul E Callahan
(74) *Attorney, Agent, or Firm* — The Small Patent Law Group LLC; Philip S. Hof (57) ABSTRACT

Systems and methods described herein measure quantum bit error rates in links between switches in a time-sensitive network, identify an increase in the quantum bit error rate in a monitored link of the links between the switches, and modify a configuration of the time-sensitive network so that secret information is not exchanged over the monitored link associated with the increase in the quantum bit error rate. The systems and methods optionally can direct computing devices to change or update the quantum key at a rate that is no slower than a rate at which the messages or frames are communicated between the computing devices. For example, a new portion of secret information used for secure communications can be created for each message and/or each frame that is communicated.

20 Claims, 3 Drawing Sheets

(51) Int. Cl.
H04L 29/06 (2006.01)
H04J 3/06 (2006.01)
H04L 9/32 (2006.01)

(52) U.S. Cl.
CPC ........ H04L 9/3297 (2013.01); H04L 63/0227 (2013.01); H04L 63/061 (2013.01); H04L 63/12 (2013.01); H04L 63/108 (2013.01); H04L 63/123 (2013.01)

(56) References Cited

U.S. PATENT DOCUMENTS

| | | | |
|---|---|---|---|
| 7,068,790 B1* | 6/2006 | Elliott | H04L 9/0852 380/256 |
| 7,374,647 B2 | 5/2008 | Mundheim et al. | |
| 7,460,670 B1* | 12/2008 | Elliott | H04L 9/0858 380/255 |
| 7,553,415 B2 | 6/2009 | Stoehr et al. | |
| 7,572,858 B2 | 8/2009 | Wang et al. | |
| 7,577,996 B1 | 8/2009 | Merchant et al. | |
| 7,900,321 B2 | 3/2011 | Fitz et al. | |
| 8,526,621 B2 | 9/2013 | Rabin et al. | |
| 9,461,821 B1 | 10/2016 | Machani et al. | |
| 2002/0110245 A1* | 8/2002 | Gruia | H04L 9/12 380/278 |
| 2008/0263647 A1 | 10/2008 | Barnett et al. | |
| 2008/0292102 A1 | 11/2008 | Wang et al. | |
| 2012/0036569 A1 | 2/2012 | Cottrell et al. | |
| 2014/0250017 A1 | 9/2014 | Khan et al. | |
| 2016/0248586 A1* | 8/2016 | Hughes | H04L 9/3226 |

OTHER PUBLICATIONS

Mehic, M., Maurhart, O., Rass, S., Komosny, D., & Rezac, F.; "Key Distribution Link", IEEE Journal of Quantum Electronics, vol. 53, No. 5, Oct. 5, 2017, (8 pages).

IEEE Standards Association, "Time-Sensitive Networking (TSN) for Industry 4.0"; Standards for Time-Sensitive Networking for use in Industrial Automation Networks, 2017 (2 pages).

Chou, C. W., Hume, D. B., Rosenband, T., & Wineland, D. J.; "Optical Clocks and Relativity." Science, 329 (5999), Sep. 24, 2010, 1630-1633. (5 pages).

Donohue, J. M., Agnew, M., Lavoie, J., & Resch, K. J.; "Coherent Ultrafast Measurement of Time-bin Encoded Photons.",Oct. 11, 2013, Physical Review Letters, vol. 111, Issue 15, 1-10. (10 pages).

Marcikic, I., de Riedmatten, H., Tittel, W., Scarani, V., Zbinden, H., & Gisin, N.; "Femtosecond Time-Bin Entangled Qubits for Quantum Communication", Dec. 2002, vol. 66, Iss. 6 (6 pages).

Goetz; "IEEE 802.1AS bt (gPTP) & IEEE 1588 v3 (PTP v3 )" Siemens, IEEE 802.1 TSN TG Meeting Orlando / USA, Mar. 19, 2013, (13 pages).

IEEE Standards Association, "IEEE Standard for Local and Metropolitan Area Networks—Timing and Synchronization for Time-Sensitive Applications in Bridged Local Area Networks.", IEEE Std 802.1AS™-2011, Status: PAR approved, technical development in process, task group ballots., Mar. 30, 2011, (292 pages).

IEEE Standards Association, "IEEE Standard for Local and Metropolitan Area Networks—Bridges and Bridged Networks—Amendment 25: Enhancements for Scheduled Traffic"; (Amendment to IEEE Std 802.1 Q-2014 as amended by IEEE Std 802.1Qca-2015, IEEE Std 802.1Qcd-2015, and IEEE Std 802.1Q-2014/Cor 1-2015), vol., No., pp. 1-57, Mar. 18, 2016. (57 pages).

IEEE Standards Association, "IEEE Standard for Local and Metropolitan Area Networks—Bridges and Bridged Networks—Amendment 26: Frame Preemption" (Amendment to IEEE Std 802.1Q-2014 as amended by IEEE Std 802.1Qca-2015, IEEE Std 802.1Qcd-2015, and IEEE Std 802.1Q-2014/Cor 1-2015), vol., No., pp. 1-57, Mar. 18, 2016. (52 pages).

IEEE Standards Association, "IEEE Standard for Local and Metropolitan Area Networks—Corrigendum 1: Technical and Editorial Corrections"; IEEE Std 802.1Q™-2014/ Cor 1-2015 (Corrigendum to IEEE Std 802.1Q-2014), Approved Dec. 5, 2015, Published Jan. 12, 2016, (122 pages).

IEEE Standards Association, "IEEE Standard for Ethernet—Amendment 5: Specification and Management Parameters for Interspersing Express Traffic"; (Amendment to IEEE Std 802.3™-2015 as amended by IEEE Std IEEE Std 802.3bw™-2015, 802.3bw™-2016, IEEE Std 802.3bq™-2016, and IEEE Std 802.3bp™-2016), Approved Jun. 30, 2016, Published Oct. 14, 2016, (58 pages).

* cited by examiner

SYSTEM AND METHOD FOR PROTECTING COMMUNICATION IN TIME-SENSITIVE NETWORKS USING SHARED SECRET INFORMATION

CROSS-REFERENCE TO RELATED APPLICATIONS

This application claims priority to U.S. Provisional Patent Application No. 62/575,719, which was filed on 23-Oct.-2017, and the entire disclosure of which is incorporated herein by reference.

FIELD

The subject matter described herein relates to sharing non-publicly available information (e.g., secret information) within computerized communication networks, such as time-sensitive networks.

BACKGROUND

The IEEE 802.1 Time-Sensitive Networking Task Group has created a series of standards that describe how to implement deterministic, scheduled Ethernet frame delivery within an Ethernet network. Time-sensitive networking benefits from advances in time precision and stability to create efficient, deterministic traffic flows in an Ethernet network.

Time-sensitive networks can be used in safety critical environments, such as control systems for automated industrial systems. In these environments, timely and fast control of machinery is needed to ensure that operators and equipment at or near the machinery being controlled are not hurt or damaged. Encryption may be needed in these networks to ensure that malevolent actors do not hack into or otherwise interfere with communication through the time-sensitive networks and cause damage or harm.

BRIEF DESCRIPTION

In one embodiment, a method includes measuring quantum bit error rates in links between switches in a time-sensitive network, identifying an increase in the quantum bit error rate in a monitored link of the links between the switches, and modifying a configuration of the time-sensitive network so that secret information is not exchanged over the monitored link associated with the increase in the quantum bit error rate.

In one embodiment, a system includes one or more processors configured to measure quantum bit error rates in links between switches in a time-sensitive network. The one or more processors also are configured to identify an increase in the quantum bit error rate in a monitored link of the links between the switches, and to modify a configuration of the time-sensitive network so that secret information is not exchanged over the monitored link associated with the increase in the quantum bit error rate.

In one embodiment, a method includes instructing computing devices that communicate messages with each other via a time-sensitive network to secure communication of the messages using shared secret information, directing the computing device to exchange the secret information via a dedicated quantum channel in the time-sensitive network, and instructing the computing devices to change the secret information at a rate that is a fraction of a rate at which one or more of the messages or frames of the messages are exchanged between the computing devices.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein relate to systems and methods that use symmetrically communicated secret information in time-sensitive networking to increase cybersecurity. The systems and methods can use a quantum and classical channel to securely generate and distribute a common shared secret for information-theoretic security, also known as perfect cybersecurity, for time-sensitive networking. This shared secret is information that is not publicly available outside of the parties or devices that exchange the information. The information can include an encryption key, an indication of non-repudiation, hashing information (e.g., a data hash), etc. While the description herein may focus on the sharing of encryption keys, not all embodiments of the inventive subject matter are limited to the sharing of encryption keys.

Quantum key distribution can be used to protect time-sensitive networking while time-sensitive networking provides support for implementing quantum key distribution. Precise synchronization and timing are needed on the quantum channel and efficient utilization of the classical channel is required to generate quantum keys at higher and more deterministic rates for use in time-sensitive networking. Quantum key distribution uses components of quantum mechanics by allowing computing devices (e.g., computers, sensors, controllers, etc.) to produce a shared random secret key known only to the computing devices. This shared key is used to encrypt and decrypt messages communicated between the computing devices. Information can be encoded in quantum states (e.g., qubits) instead of bits, which allows the computing devices to detect when a third party computing device is attempting to detect or listen in to the communications using the quantum key. This third party attempt can slightly introduce errors during reception of the shared quantum key, which is detected by one or more of the computing devices.

In one embodiment, a control system and method for a time-sensitive network transmits symmetric secret information (e.g., information that is not publicly available outside of the parties or devices that exchange the information) through the time-sensitive network using deterministic scheduling of the network to enforce the life-time of the secret information. The life-time of the secret information can be for the exchange of a single message in the network. For example, a quantum key can be created and shared between computing devices that are communicating through or via the time-sensitive network, with the key only being valid and used for the sending of a single message from one computing device to another computing device, and not for any reply or other message between the computing devices. At least one technical effect of the subject matter described herein provides for increased security in the communication of time-sensitive packets in a time-sensitive network. This can help ensure the safe and secure communication of information that is communicated in a time critical manner.

The computing devices can use a schedule dictated by a scheduler device of the time-sensitive network to determine when to communicate time-sensitive messages, and the scheduler device can create the schedule to generate secret information for the computing devices so that each secret information is used for the communication of only a single message in the time-sensitive network. The valid life-time of the secret information is determined by scheduled time-sensitive network windows or via output from the scheduler device of the time-sensitive network. After the life-time of the key or the scheduled window has expired, the secret information is no longer valid for communications via the time-sensitive network. The time periods or windows over which the secret information are valid are very short, tightly-controlled timescales.

Figure 1:
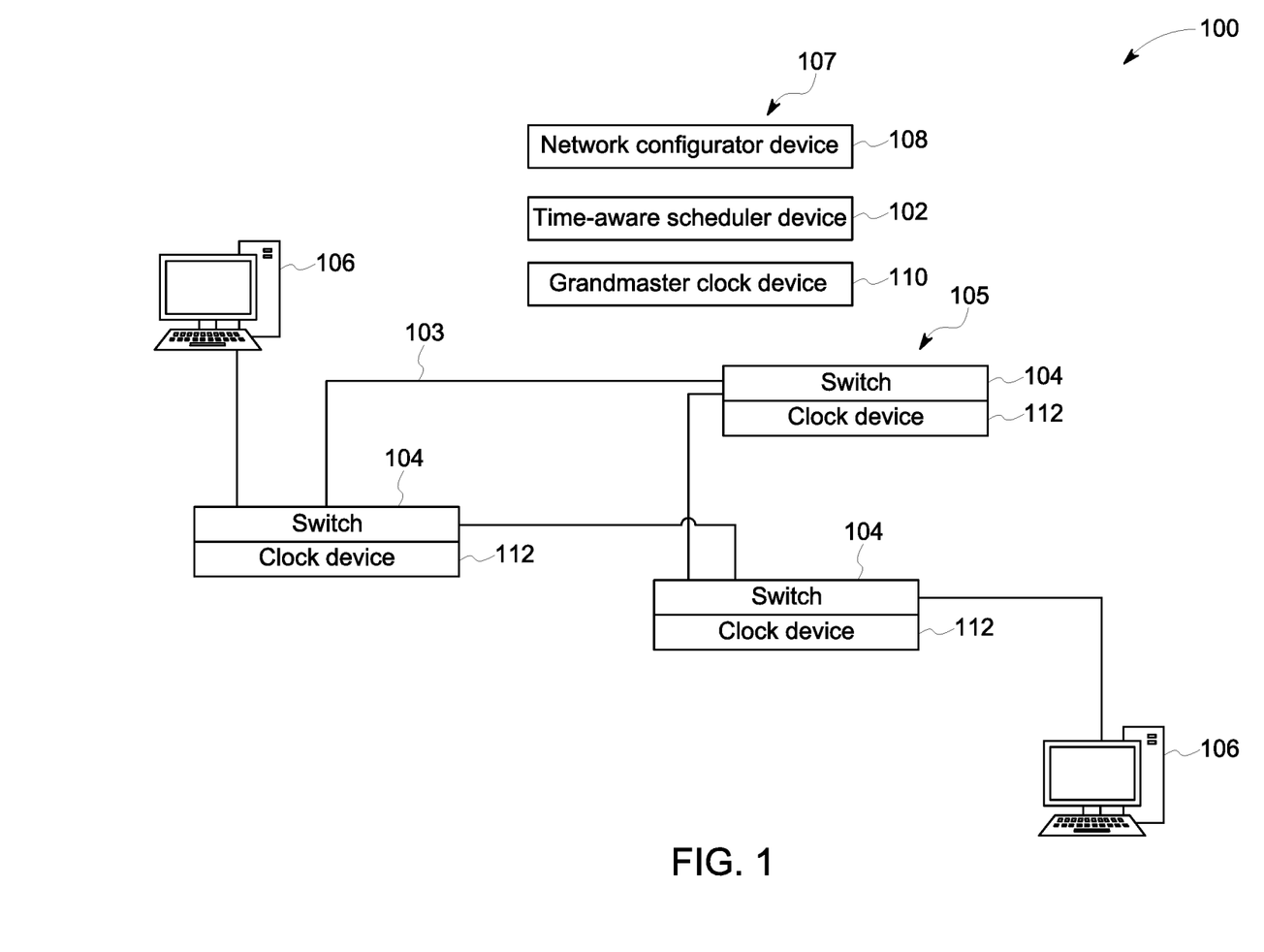
FIG. 1 schematically illustrates one embodiment of a network control system of a time-sensitive network system.

FIG. 1 schematically illustrates one embodiment of a network control system 107 of a time-sensitive network system 100. The components shown in FIG. 1 represent hardware circuitry that includes and/or is connected with one or more processors (e.g., one or more microprocessors, field programmable gate arrays, and/or integrated circuits) that operate to perform the functions described herein. The components of the network system 100 can be communicatively coupled with each other by one or more wired and/or wireless connections. Not all connections between the components of the network system 100 are shown herein. The network system 100 can be a time-sensitive network in that the network system 100 is configured to operate according to one or more of the time-sensitive network standards of IEEE, such as the IEEE 802.1AS™-2011 Standard, the IEEE 802.1Q™-2014 Standard, the IEEE 802.1Qbu™-2016 Standard, and/or the IEEE 802.3br™-2016 Standard.

The network system 100 includes several nodes 105 formed of network switches 104 and associated clocks 112 ("clock devices" in FIG. 1). While only a few nodes 105 are shown in FIG. 1, the network system 100 can be formed of many more nodes 105 distributed over a large geographic area. The network system 100 can be an Ethernet network that communicates data signals along, through, or via communication links 103 between computing devices 106 (e.g., computers, control systems, sensors, etc.) through or via the nodes 105. The links 103 can represent one or more of a variety of different communication paths, such as Ethernet links, optical links, copper links, and the like. The data signals are communicated as data packets sent between the nodes 105 on a schedule of the network system 100, with the schedule restricted what data signals can be communicated by each of the nodes 105 at different times.

For example, different data signals can be communicated at different repeating scheduled time periods based on traffic classifications of the signals. Some signals are classified as time-critical traffic while other signals are classified as best effort traffic. The time-critical traffic can be data signals that need or are required to be communicated at or within designated periods of time to ensure the safe operation of a powered system. The best effort traffic includes data signals that are not required to ensure the safe operation of the powered system, but that are communicated for other purposes (e.g., monitoring operation of components of the powered system).

The control system 107 includes a time-aware scheduler device 102 that enables each interface of a node 105 to transmit an Ethernet frame (e.g., between nodes 105 from one computer device 106 to another device 106) at a prescheduled time, creating deterministic traffic flows while sharing the same media with legacy, best-effort Ethernet traffic. The time-sensitive network 100 has been developed to support hard, real-time applications where delivery of frames of time-critical traffic must meet tight schedules without causing failure, particularly in life-critical industrial control systems. The scheduler device 102 computes a schedule that is installed at each node 105 in the network system 100. This schedule dictates when different types or classification of signals are communicated by the switches 104.

The scheduler device 102 remains synchronized with a grandmaster clock device 110 that includes is a clock to which clock devices 112 of the nodes 105 are synchronized. A centralized network configurator device 108 of the control system 107 is comprised of software and/or hardware that has knowledge of the physical topology of the network 100 as well as desired time-sensitive network traffic flows. The configurator device 108 can be formed from hardware circuitry that is connected with and/or includes one or more processors that determine or otherwise obtain the topology information from the nodes 105 and/or user input. The hardware circuitry and/or processors of the configurator device 108 can be at least partially shared with the hardware circuitry and/or processors of the scheduler device 102.

The topology knowledge of the network system 100 can include locations of nodes 105 (e.g., absolute and/or relative locations), which nodes 105 are directly coupled with other nodes 105, etc. The configurator device 108 can provide this information to the scheduler device 102, which uses the topology information to determine the schedules for communication of secret information (e.g., encryption keys) and messages between the devices 106 (that may be encrypted using the secret information). The configurator device 108 and/or scheduler device 102 can communicate the schedule to the different nodes 105.

A link layer discovery protocol can be used to exchange the data between the configurator device 108 and the scheduler device 102. The scheduler device 102 communicates with the time-aware systems (e.g., the switches 104 with respective clocks 112) through a network management protocol. The time-aware systems implement a control plane element that forwards the commands from the centralized scheduler device 102 to their respective hardware.

In one embodiment, the configurator device 108 creates and distributes secret information, such as quantum encryption keys, among the computing devices 106 for time-sensitive network cybersecurity. Quantum states can be robustly created for the quantum keys using time-bin encoding, which can require extremely small-time scales to increase the quantum key rate (e.g., the rate at which the encryption keys are created).

Time-sensitive networks can be used in life-critical industrial control applications such as the power grid where cybersecurity is important. The configurator device 108 can use quantum mechanics in the form of quantum photonics to create and share secret information, such as quantum keys. There are many variants of quantum keys that impact both the quantum and classical channels. A quantum state is exchanged between the devices 106 over a quantum channel in the network and is protected by the physics of quantum mechanics. A third party eavesdropper is detected by causing a change to the quantum state. Then a series of classical processing is performed to extract and refine the key material. This processing can involve sifting or extraction of the raw key, quantum bit error rate estimation, key reconciliation, and privacy amplification and authentication. This series of classical processing usually requires a public channel, typically by means of TCP connections in the network. For the classical channel, current implementations of quantum key distribution rely upon TCP. However, operating directly over Ethernet with time-sensitive networks can be more efficient. TCP guarantees that the information exchanged on the public channel is delivered. However, it is vulnerable to congestion and to Denial of Service (DoS) attacks that disrupt key generation. TCP congestion can have a significant impact on the quantum key generation rate.

On the contrary, time-sensitive networking via the scheduler device 102 can guarantee the delivery of the information and be more efficient. The time-sensitive network can remove the need for handshaking processes, resending of TCP segments, and rate adjustment by the scheduler device 102 scheduling or otherwise allocating dedicated time slots for secret information generation and distribution. Implementing the classical channel over a time-sensitive network eliminates variability and ensures more robust and deterministic generation of secret information, which can be required by a time-sensitive network.

Control of a quantum channel in the network 100 requires precise timing that time-sensitive networks provide. The quantum channel can be a dedicated link 103, such as a fiber optic connection, between the devices 106, or can be available bandwidth space within the network 100. The quantum state can be encoded in various ways, including polarization. Alternatively, time-bin encoding and entanglement can be used for encoding the quantum state in the secret information. Time-bin encoding implements the superposition of different relative phases onto the same photon. Quantum measurement is implemented by measuring the time of arrive of the photon. This requires precise and stable time synchronization, typically an accuracy of 30 ns is required.

An eavesdropper will cause the quantum bit error rate of the secret information to increase, thereby alerting the configurator device 108 to the presence of the eavesdropper. Because the time-sensitive network 100 is assumed to provide deterministic traffic flow for life-critical control systems, a reaction to an attack by the configurator device 108 maintains determinism throughout the network 100. For example, if the time-sensitive network flow shares the optical channel used by the quantum secret information, then the quantum and classical communication flows may be rerouted by the configurator device 108 to avoid potential tampering. Stated differently, the time-sensitive communications sent between the switches 104 (according to the schedules dictated by the scheduler device 102) and the quantum secret information can be communicated over the same links 103 in the network 100. The configurator device 108 can maintain the existing schedule solution for the links 103 that are safe (where no third party action occurred), and removing the link or links 103 exhibiting greater or higher quantum bit error rates from use in the network 100.

For example, the configurator device 108 can monitor the quantum bit error rate on or in the links 103 of the time sensitive network 100. The configurator device 108 can detect an increase in the quantum bit error rate in one link 103 relative to the quantum bit error rate in one or more (or all) other links 103 in the network 100. The configurator device 108 can then remove the link 103 with the larger error rate from the configuration of the network 100 and can inform the scheduler device 102 of this removal. The scheduler device 102 can then update or revise the schedule(s) for the time sensitive network 100 with this link 103 being removed and, therefore, not used for the communication of time-sensitive signals or messages, or for the communication of secret information.

Figure 2:
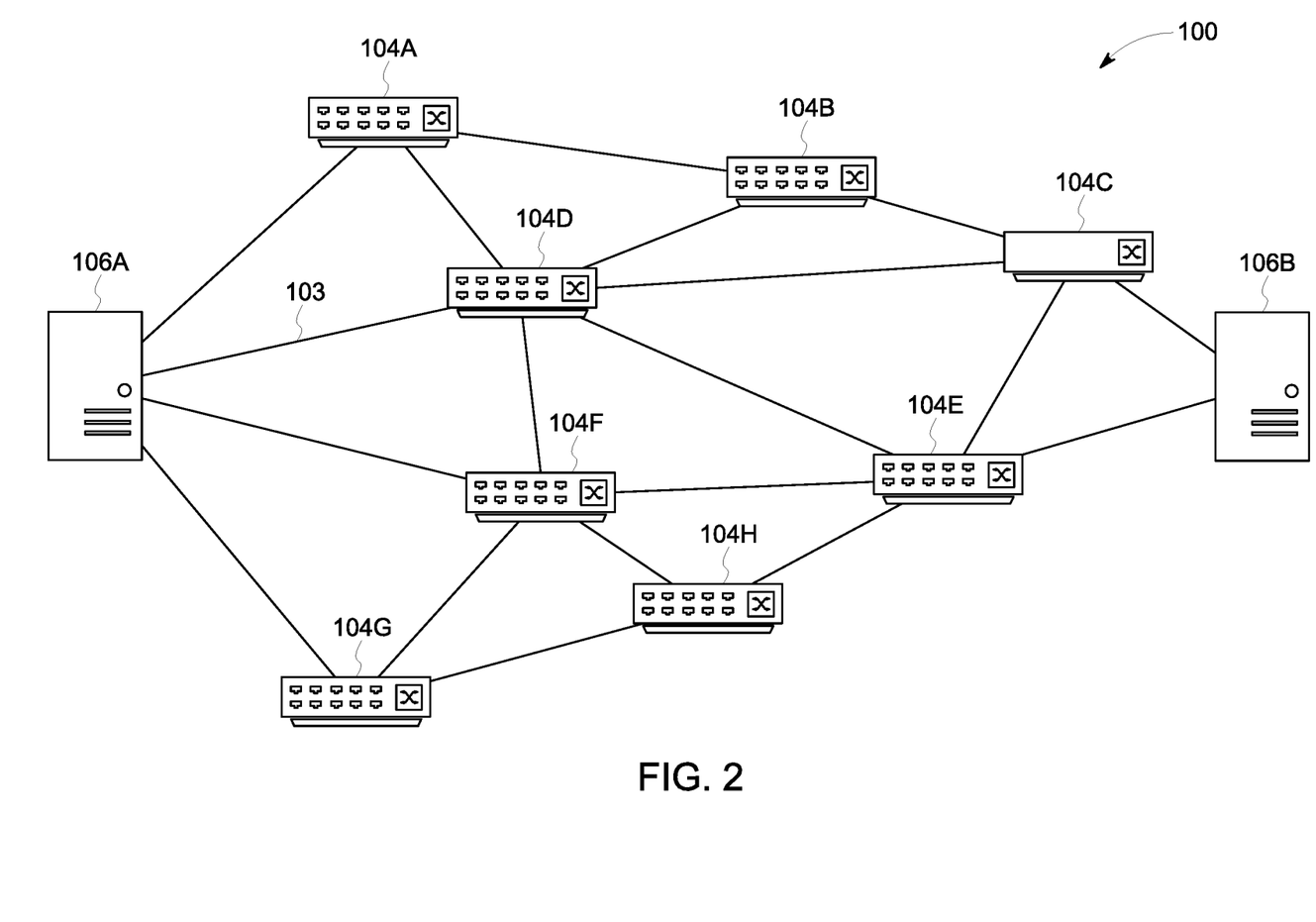
FIG. 2 is another illustration of the time-sensitive network system shown in FIG. 1.

As a result, the scheduler device 102 finds or creates a schedule that maintains the existing safe flows of messages and adds a new flow that bypasses the suspected link. FIG. 2 is another illustration of the time-sensitive network 100 shown in FIG. 1. As described above, plural computing devices 106 (e.g., devices 106A, 106B in FIG. 2) communicate frames of messages with each other on a schedule dictated by the scheduler device 102. The frames are sent from the device 106A to the device 106B along one or more paths defined by a combination of links 103 and switches 104 (e.g., switches 104A-H in FIG. 2). The secret information can be exchanged along a first path (e.g., the path that is formed by the switches 104C, 104D and the links 103 between the devices 106A, 106B and the switches 104C, 104D), and time-sensitive messages can be exchanged along another path that does not include any of the same links 103 or switches 104, or that includes at least one different link 103 or switch 104. For example, the messages can be sent along a path that extends through the switches 104G, 104F, 104E and the links 103 that connect the devices 106A, 106B and the switches 104G, 104F, 104E. The path used to exchange the secret information can be referred to as the quantum channel.

In one embodiment, the schedule for the network 100 is created by the configurator device 108 to include the constraints of creating and transmitting the secret information (e.g., the quantum key) to protect an Ethernet frame. For example, the configurator device 108 may solve a system of scheduling equations to create a time-sensitive schedule for the switches to send Ethernet frames in a time-sensitive manner in the network 100. This schedule may be subject to various constraints, such as the topology of the network 100, the speed of communication by and/or between switches in the network 100, the amount of Ethernet frames to be communicated through different switches, etc. This schedule can be created to avoid two or more Ethernet frames colliding with each other at a switch (e.g., to prevent multiple frames from being communicated through the same switch at the same time). One additional constraint for generation of the time-sensitive schedule by the configurator device 108 can be the generation and communication of the secret information through the time-sensitive network 100. For example, the schedule may include or be required to include time(s) dedicated to communication of only the shared information along or via one or more links in the network 100. Other frames may not be allowed by the schedule to be communicated during these dedicated times. The configurator device 108 may be restricted to generating the time-sensitive schedule to include these times dedicated to communication of the secret information.

The configurator device 108 can detect an increase in the quantum bit error rate in one or more of the links 103, such as the link 103 between the switches 104C, 104D. Detection of this increase can cause the configurator device 108 to stop sending the secret information between the devices 106A, 106B across, through, or via the link 103 between the switches 104C, 104D. This increase can indicate that an unauthorized third party is attempting to obtain or change the secret information exchanged between the devices 106A, 106B. The configurator device 108 can change to sending the secret information between the devices 106A, 106B (or directing the devices 106A, 106B to send the secret information) through, across, or via a path that extends through the switches 104A, 104B, 104C (and the links 103 between these switches 104A, 104B, 104C). This causes the secret information to avoid or no longer be communicated through or over the link 103 associated with the increase in the quantum bit error rate. This increases security in the network 100, as the configurator device 108 can repeatedly change which paths are used or dedicated for exchanging secret information so as to avoid those portions of network paths that are associated with increases in the quantum bit error rate.

Another approach to an increasing or a suspiciously high quantum bit error rate is to decrease lifetimes of the secret information and thereby generate new secret information at a faster rate. For example, the configurator device 108 can create or instruct the devices 106A, 106B to create a new quantum of secret information for each message that is exchanged between the devices 106A, 106B. If the device 106A is a sensor and the device 106B is a controller that changes operation of a powered system in response to a sensed parameter, then a first quantum of secret information can be created and used to encrypt and send a first message from the sensor device 106A to the controller device 106B (that includes sensed information from the sensor device 106A). The controller device 106B can receive the encrypted message, decrypt the message, and perform an action based on the sensed parameter. The controller device 106B can send a message back to the sensor device 106A using a different quantum of secret information, such as an encrypted confirmation message indicating receipt of the sensed parameter. Subsequent sensed parameters can be communicated using messages each encrypted with a different quantum of secret information.

For example, the scheduler device 102 can compute a secret information update rate that is a given or designated fraction of the time-sensitive network frame transmission rate. This fraction can be less than one such that a new quantum of secret information is created for each message or each frame of a message. Stated differently, a new encryption key can be generated and used for encrypting each time-sensitive network frames that is sent between the devices 106. The secret information can be symmetric secret information that is transmitted through the time-sensitive network 100 using deterministic scheduling to enforce the life-time of the secret information (e.g., which can be as short as the exchange of a single frame or a single message formed of two or more frames). Such a constraint is added to the scheduler device 102 so that the scheduler device 102 will find a schedule that is feasible for the given topology, requested flow latency, frame sizes, and update rate of the secret information for each link 103. For example, the scheduler device 102 can balance (e.g., adjust) the scheduled time periods of when new quantum keys are exchanged, when time-sensitive frames are communicated, when best effort frames are communicated, and the like, to ensure that the time-sensitive frames are successfully communicated between the devices 106 within designated time limits while also providing a new encryption key for each message or each frame.

Figure 3:
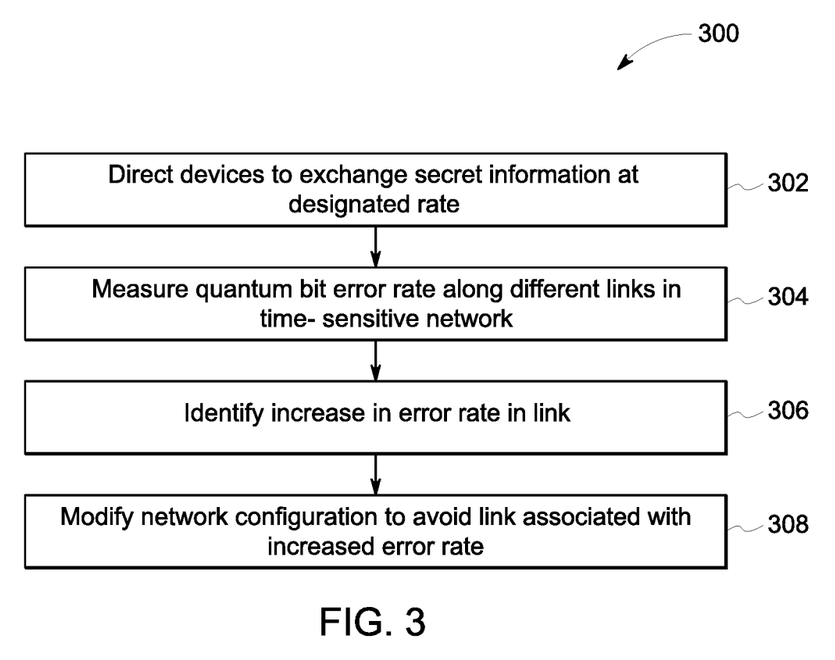
FIG. 3 illustrates a flowchart of one embodiment of a method for securing communications in a time-sensitive network.

FIG. 3 illustrates a flowchart of one embodiment of a method 300 for securing communications in a time-sensitive network. The method 300 can represent operations performed by the control system 107 (e.g., by the configurator device 108 and/or the scheduler device 102). At 302, computing devices are directed to exchange secret information at a designated rate. For example, the configurator device 108 or scheduler device 102 can instruct the devices 106 to exchange encryption keys at a designated rate so that a new key is created on a repeating basis. In one embodiment, the configurator device 108 or scheduler device 102 instructs the devices 106 to create a new portion of secret information for each message that is sent from one device 106 to another device 106. A message is formed from two or more data frames in an Ethernet network such as the network system 100. Optionally, the configurator device 108 or scheduler device 102 can instruct the devices 106 to create a new portion of secret information at a greater or faster rate, such as for each frame of a message formed from two or more frames.

At 304, an error rate along one or more links in the time-sensitive network is measured. For example, the configurator device 108 can measure the quantum bit error rate along each link 103 in a quantum channel between the devices 106. This channel may be dedicated to exchanging secret information between the devices 106, and can be formed of a combination of links 103 and switches 104. The configurator device 108 can measure or calculate the quantum bit error rate in each link 103 along this channel.

At 306, in increase in the error rate of one or more of the links that is monitored is identified. For example, the configurator device 108 can determine that the quantum bit error rate in a link 103 between two switches 104 is increasing or is increasing by more than a designated threshold (e.g., more than 10%). This increase can indicate that an unauthorized third party is attempting to obtain the secret information along the quantum channel. As a result, the configurator device 108 can identify which link 103 is associated with the increased error rate and can instruct the scheduler device 102 to modify the communication schedules of the time-sensitive network. At 308, the configuration of the network is modified to avoid exchanging the secret information over the link associated with the increased error rate. For example, the configurator device 108 can instruct the scheduler device 102 to no longer communicate quantum keys along, through, or over the link 103 associated with the increased error rate. The scheduler device 102 can modify the schedule of the time-sensitive network to allow for the secret information to be exchanged over a different path, while scheduling sufficient resources for successful and timely communication of time-sensitive messages.

In one embodiment, a method includes measuring quantum bit error rates in links between switches in a time-sensitive network, identifying an increase in the quantum bit error rate in a monitored link of the links between the switches, and modifying a configuration of the time-sensitive network so that secret information is not exchanged over the monitored link associated with the increase in the quantum bit error rate. This secret information can be used for secure communication through or via the network.

Optionally, the secret information can include one or more of a quantum encryption key, an indication of non-repudiation, or a data hash.

Optionally, the quantum bit error rates are measured in the links that form a quantum channel between computing devices that is dedicated to exchanging the secret information.

Optionally, modifying the configuration of the time-sensitive network includes changing a schedule for communication of the secret information, time-sensitive messages, and best-effort messages within the time-sensitive network.

Optionally, changing the schedule includes changing which of the links are used to form a dedicated quantum channel over which the secret information are exchanged between computing devices.

Optionally, the method also includes instructing computing devices that exchange the secret information to change the secret information at a rate that is a fraction of a rate at which one or more of messages or frames of the messages are exchanged between the computing devices.

Optionally, the computing devices are instructed to change the secret information at least once for each new message of the messages that are exchanged between the computing devices.

Optionally, the computing devices are instructed to change the secret information at least once for each frame of each new message of the messages that are exchanged between the computing devices.

In one embodiment, a system includes one or more processors configured to measure quantum bit error rates in links between switches in a time-sensitive network. The one or more processors also are configured to identify an increase in the quantum bit error rate in a monitored link of the links between the switches, and to modify a configuration of the time-sensitive network so that secret information is not exchanged over the monitored link associated with the increase in the quantum bit error rate. This secret information can be used for secure communication through or via the network.

Optionally, the secret information can include one or more of a quantum encryption key, an indication of non-repudiation, or a data hash.

Optionally, the one or more processors are configured to measure the quantum bit error rates in the links that form a quantum channel between computing devices that is dedicated to exchanging the secret information.

Optionally, the one or more processors are configured to modify the configuration of the time-sensitive network by changing a schedule for communication of the secret information, time-sensitive messages, and best-effort messages within the time-sensitive network.

Optionally, the one or more processors are configured to change the schedule by changing which of the links are used to form a dedicated quantum channel over which the secret information are exchanged between computing devices.

Optionally, the one or more processors are configured to instruct computing devices that exchange the secret information to change the secret information at a rate that is a fraction of a rate at which one or more of messages or frames of the messages are exchanged between the computing devices.

Optionally, the one or more processors are configured to instruct the computing devices to change the secret information at least once for each new message of the messages that are exchanged between the computing devices.

Optionally, the one or more processors are configured to instruct the computing devices to change the secret information at least once for each frame of each new message of the messages that are exchanged between the computing devices.

In one embodiment, a method includes instructing computing devices that communicate messages with each other via a time-sensitive network to encrypt the messages using a secret information, directing the computing device to exchange the secret information via a dedicated quantum channel in the time-sensitive network, and instructing the computing devices to change the secret information at a rate that is a fraction of a rate at which one or more of the messages or frames of the messages are exchanged between the computing devices.

Optionally, the secret information includes one or more of a quantum encryption key, an indication of non-repudiation, or a data hash.

Optionally, the computing devices are instructed to change the secret information at least once for each new message of the messages that are exchanged between the computing devices.

Optionally, the computing devices are instructed to change the secret information at least once for each frame of each new message of the messages that are exchanged between the computing devices.

Optionally, the method includes measuring quantum bit error rates in links between switches in the time-sensitive network, identifying an increase in the quantum bit error rate in a monitored link of the links between the switches, and modifying a configuration of the time-sensitive network so that the secret information is not exchanged between the computing devices over the monitored link associated with the increase in the quantum bit error rate.

Optionally, the quantum bit error rates are measured in the links that form the quantum channel.

Optionally, modifying the configuration of the time-sensitive network includes changing a schedule for communication of the secret information, time-sensitive messages, and best-effort messages within the time-sensitive network.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
measuring a respective quantum bit error rate in each of multiple links between switches in a time-sensitive network, wherein the time-sensitive network is used to communicate data signals at different scheduled time periods based on traffic classifications of the data signals;
identifying an increase in the respective quantum bit error rate in a monitored link of the links between the switches; and
modifying a configuration of the time-sensitive network so that secret information is not exchanged over the monitored link associated with the increase in the quantum bit error rate.

2. The method of claim 1, wherein the secret information includes one or more of a quantum encryption key, an indication of non-repudiation, or a data hash.

3. The method of claim 1, wherein the quantum bit error rates are measured in the links that form a quantum channel between computing devices, the quantum channel dedicated to exchanging the secret information.

4. The method of claim 1, wherein modifying the configuration of the time-sensitive network includes changing a schedule for communication of the secret information and the data signals within the time-sensitive network, the data signals defining time-sensitive messages and best-effort messages.

5. The method of claim 4, wherein changing the schedule includes changing which of the links are used to exchange the secret information between computing devices.

6. The method of claim 1, further comprising instructing computing devices that exchange the secret information to change the secret information at a faster rate than a rate at which the secret information is changed prior to identifying the increase in the quantum bit error rate in the monitored link.

7. The method of claim 6, wherein the computing devices are instructed to change the secret information at least once for each new message that is exchanged between the computing devices.

8. The method of claim 6, wherein the computing devices are instructed to change the secret information at least once for each frame of each new message that is exchanged between the computing devices.

9. A system comprising:
one or more processors configured to measure a respective quantum bit error rate in each of multiple links between switches in a time-sensitive network, wherein the time-sensitive network is used to communicate data signals at different scheduled time periods based on traffic classifications of the data signals,
the one or more processors also configured to identify an increase in the respective quantum bit error rate in a monitored link of the links between the switches, and to modify a configuration of the time-sensitive network so that secret information is not exchanged over the monitored link associated with the increase in the quantum bit error rate.

10. The system of claim 9, wherein the secret information includes one or more of a quantum encryption key, an indication of non-repudiation, or a data hash.

11. The system of claim 9, wherein the one or more processors are configured to measure the quantum bit error rates in the links that form a quantum channel between computing devices, the quantum channel dedicated to exchanging the secret information.

12. The system of claim 9, wherein the one or more processors are configured to modify the configuration of the time-sensitive network by changing a schedule for communication of the secret information and the data signals within the time-sensitive network, the data signals defining time-sensitive messages and best-effort messages, the one or more processors configured to change the schedule by changing which of the links are used to exchange the secret information is exchanged between computing devices.

13. The system of claim 9, wherein the one or more processors are configured to instruct computing devices that exchange the secret information to change the secret information at a faster rate than a rate at which the secret information is changed prior to identifying the increase in the quantum bit error rate in the monitored link.

14. The system of claim 13, wherein the one or more processors are configured to instruct the computing devices to change the secret information at least once for each new message is exchanged between the computing devices.

15. The system of claim 13, wherein the one or more processors are configured to instruct the computing devices to change the secret information at least once for each frame of each new message that is exchanged between the computing devices.

16. The system of claim 9, wherein the one or more processors are configured to measure the quantum bit error rates in at least some links in the time-sensitive network that are used to communicate the secret information during a first scheduled time period and to communicate the data signals which represent time-sensitive messages during a second scheduled time period.

17. The system of claim 9, wherein the one or more processors represent hardware circuitry of a control system of the time-sensitive network.

18. A method comprising:
instructing computing devices that communicate messages with each other via a time-sensitive network to securely exchange the messages using secret information, wherein the messages are exchanged between the computing devices via multiple switches and links of the time-sensitive network, the links disposed between the switches, the messages communicated through the time-sensitive network at different scheduled time periods based on traffic classifications of the messages;
directing the computing devices to exchange the secret information via at least some of the switches and links of the time-sensitive network that are used to exchange the messages; and
instructing the computing devices to change the secret information for one or more of each of the messages or each frame of the messages exchanged between the computing devices.

19. The method of claim 16, further comprising:
measuring a respective quantum bit error rates rate in each of the links of the time-sensitive network that are used to exchange the secret information;

identifying an increase in the respective quantum bit error rate in a monitored link of the links; and modifying a configuration of the time-sensitive network so that the secret information is not exchanged over the monitored link associated with the increase in the quantum bit error rate.

20. The method of claim 1, wherein the quantum bit error rates are measured in at least some links in the time-sensitive network that are used to communicate the secret information during a first scheduled time period and to communicate the data signals which represent time-sensitive messages during a second scheduled time period.

* * * * *